Figure 1:
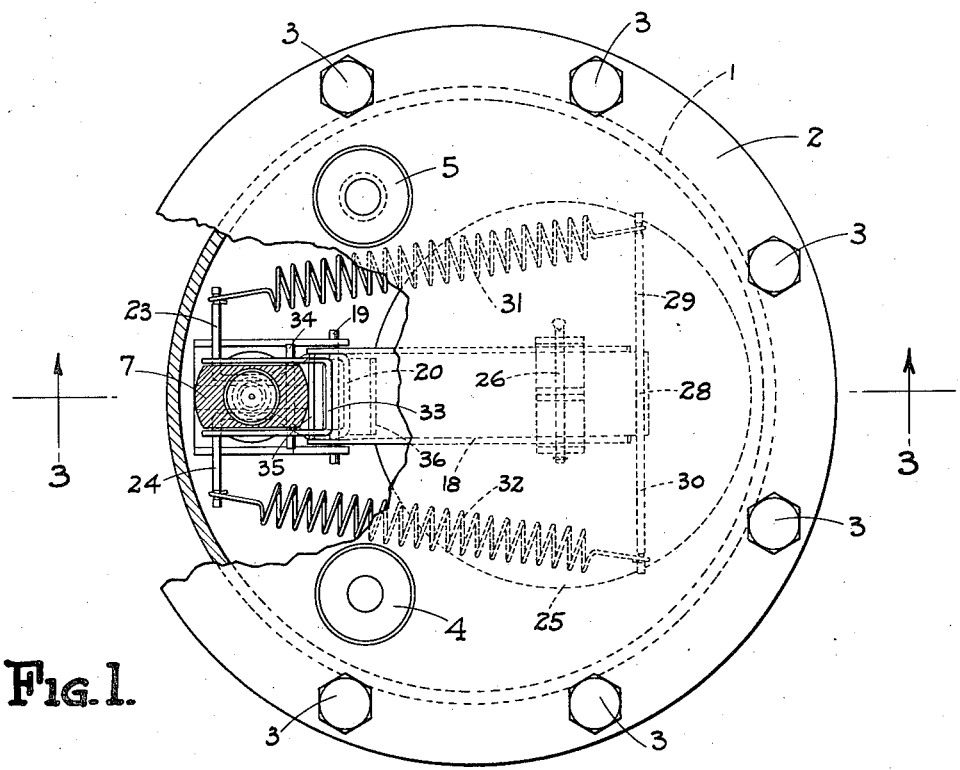

Jan. 5, 1943.  C. P. DEIBEL ET AL  2,307,115
STORAGE AND COOLING VESSEL
Filed June 21, 1941   2 Sheets-Sheet 1

INVENTORS.
CYRIL P. DEIBEL
OSCAR A. KNABLE
RALPH ANSHUTZ
BY William E. Chilton
ATTORNEY.

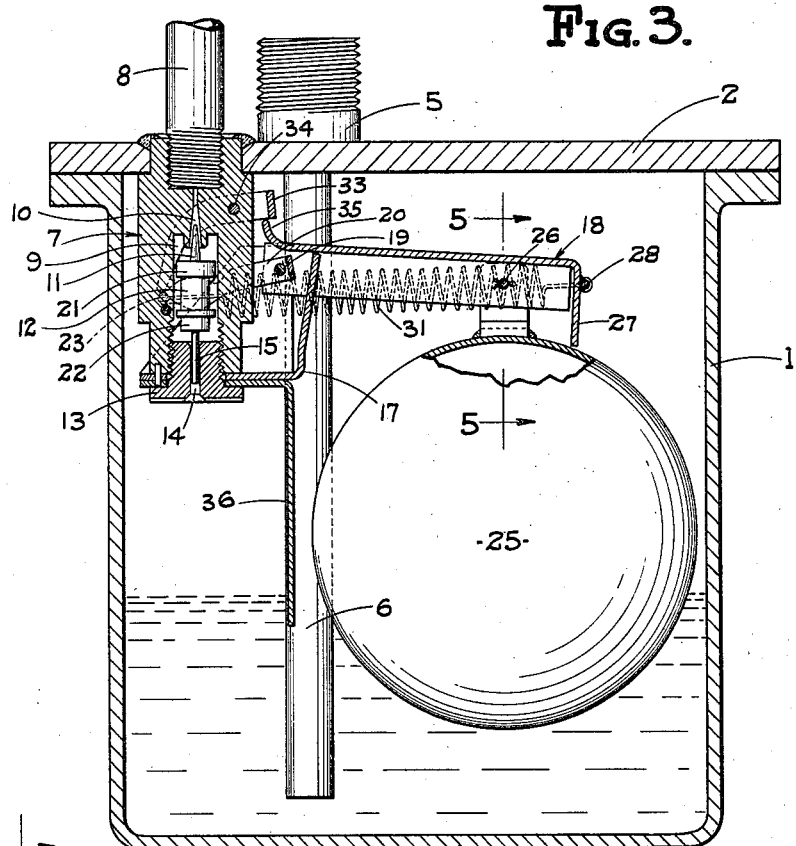

Patented Jan. 5, 1943

2,307,115

UNITED STATES PATENT OFFICE 2,307,115

STORAGE AND COOLING VESSEL

Cyril P. Deibel and Oscar A. Knable, Lakewood, and Ralph Anshutz, Cleveland, Ohio; said Knable and said Anshutz assignors to said Deibel Application June 21, 1941, Serial No. 399,198

3 Claims. (Cl. 225—9)

This invention relates to a storage and cooling vessel for carbonated water which is particularly adapted for use at soda fountains, bars and the like for storing, cooling and dispensing carbonated water. Carbonated water should be dispensed with the highest possible gas content and at as low a temperature as is practical, as the amount of carbon dioxide gas which the water will absorb and retain is substantially inversely proportional to the temperature of the water. It is desirable that the water be maintained in the cooler for a sufficient period of time to become properly chilled and to permit it to absorb an additional amount of gas which accumulates in the upper portion of the cooler. If the carbonated water in the cooling vessel is not maintained sufficiently cold, there is a tendency for a relatively large amount of carbon dioxide to free itself from the water as the temperature of the water rises; and this gas tends to accumulate in the space above the water and eventually prevents the cooling vessel from being filled and refilled to the desired level.

One of the objects of this invention is to provide means for venting this excess accumulation of free gas at frequent intervals. However, it is desirable to maintain a small head of gas within the cooling vessel so that the water may absorb an additional amount of gas as it is being cooled. The storage and cooling vessel is preferably in open communication with the supply of carbonated water and additional carbonated water flows into the vessel as the water is dispensed therefrom.

Another object of the invention is to provide a storage and cooling vessel of the character described having float control means for venting the vessel at frequent intervals so as to prevent an excess accumulation of free gas within the vessel, such venting means being operated with a snap action so that the vent valve will be positively opened and closed under predetermined conditions.

A further object of the invention is to provide a storage and cooling vessel for carbonated water having float operated venting means for venting the vessel under predetermined conditions and which is also provided with additional means also operated by the float to positively open the vent valve irrespective of the pressure conditions within the vessel when the water reaches a predetermined level.

A still further object of the invention is to provide a storage and cooling vessel for carbonated water and float control venting means therefor having the above described distinguishing features and characteristics; which is well adapted for production at comparatively low cost; and which is positive and dependable in operation.

Figure 2:
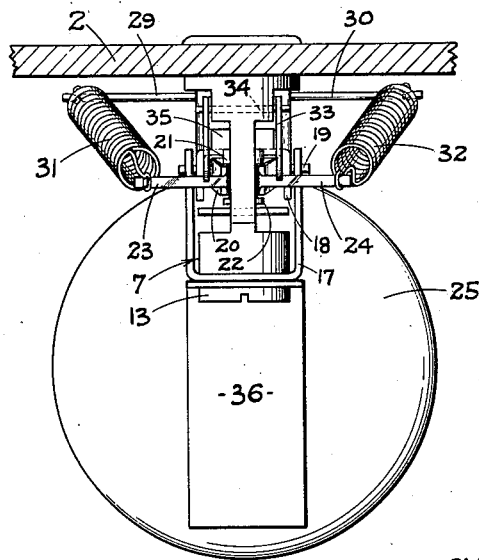

Further and more limited objects of the invention will appear as the description proceeds and by reference to the accompanying drawings in which Fig. 1 is a top plan view of my improved vessel with parts broken away to more clearly disclose and illustrate the float operated venting mechanism; Fig. 2 is a fragmentary sectional view taken approximately on the line 2—2 of Fig. 4; Fig. 3 is a vertical sectional view on the line 3—3 of Fig. 1; Fig. 4 is a fragmentary view partly in section and partly in elevation disclosing details of the venting mechanism; and Fig. 5 is a fragmentary sectional view on the line 5—5 of Fig. 3.

Referring now to the drawings, the reference character 1 designates a cooling and storage vessel which is closed by a cover 2 which is held in place by suitable bolts 3. Carried by the cover member 2 is an inlet connection 4 which is adapted for connection with a source of supply of carbonated water. Also carried by the cover member is a dispensing connection 5 having a pipe 6 connected therewith and leading to a point adjacent the bottom of the vessel and through which carbonated water is dispensed to a draft arm.

Also carried by the cover member 2 is a vent fitting 7 which is preferably welded or soldered to the cover member and from which leads a vent pipe 8 which may be connected with the draft arm, if desired. The vent fitting is shown in section in Fig. 3 and is provided with a cutaway portion or bore 9 which communicates with a vent passageway 10 which is shaped to provide a tapered valve seat. Fitting within the bore 9 is a vent valve which has a tapered portion 11 and an elongated portion 12. The lower end of the bore 9 is interiorly threaded and receives therein a plug 13 having an axially extending passageway 14 therein. Secured to the valve member 12 and fitting in the bore 14 is a valve guiding stem 15. Secured to the vent fitting by the plug 13 is a somewhat U-shaped bracket 17 and pivotally secured to the bracket 17 is an arm 18 which is held in place by a pivot pin 19. Also pivotally mounted on the pivot pin 19 is a U-shaped bail 20 the opposite ends of which engage between spaced shoulders 21 and 22 formed on opposite sides of the elongated portion 12 of the valve. The bail 20 has a pair of extensions or arms 23 and 24 thereon disposed at opposite sides thereof. Pivotally secured to the arm 18 is a float 25 which is held in place by a pin 26. The arm 18 is provided at its outer end with a downturned portion 27 and secured thereto is an arm 28 having oppositely disposed extensions 29 and 30. Connecting the extensions 23 and 29 is a coil spring 31 and connecting the extensions 24 and 30 is a coil spring 32. As the bail 20 and the arm 18 pivot about the same axis, namely the pin 19, it will be seen that the springs 31 and 32 serve to move the valve to the open position or to the closed position with a snap action.

Pivotally mounted on the vent fitting 7 is a somewhat U-shaped bail 33 which is held in place by a pin 34. The arm 18 is curved upwardly at its inner end as indicated at 35 and is positioned so as to engage the bail 33. The opposite ends of the bail are disposed over and engage the extensions 23 and 24 of the bail 20. When the float falls to the position shown in Fig. 3, the springs 31 and 32 tend to move the valve to the open position shown in Fig. 3. As the float falls, the curved extension 35 on the arm 18 also engages the bail 33, the opposite ends of which engage the extensions 23 and 24 to serve as additional means for positively opening the vent valve. This mechanism absolutely insures the opening of the vent valve when the float falls irrespective of pressure conditions within the storage vessel. It is of course understood that when the vent valve is opened, any excess gas within the vessel escapes through the vent pipe 8. As the vessel is refilled, the float rises to the position shown in Fig. 4 until the springs 31 and 32 move past center, at which time the valve is moved to closed position with a snap action. Carried by the lower end of the vent fitting is a plate or shield 36 which is somewhat L-shaped and which is held in place by the nut or plug 13. This shield serves to prevent undue tipping of the float.

It will therefore be clear that when carbonated water is dispensed from the vessel at a sufficiently rapid rate, the level of liquid therein falls to a point substantially as indicated in Fig. 3 at which time the vent valve is opened and excessive pressure within the vessel is relieved. As the vessel is in open communication with a source of supply of carbonated water, carbonated water flows into the vessel until the float is moved to the position shown in Fig. 4 at which time the vent valve is closed and very little additional carbonated water can flow into the vessel. It will thus be seen that a substantial head of gas is maintained above the carbonated water in the vessel and that it is only when the level of water falls below a predetermined point that the vent valve is opened. This insures any excessive amount of gas being trapped within the vessel so as to prevent the refilling thereof. The vent valve is opened and closed with a snap action and additional means is provided for insuring an opening of the same when the level of liquid in the vessel falls below a predetermined point.

It will now be clear that we have provided a storage and cooling vessel and venting means therefor which will accomplish the objects of the invention as hereinbefore stated. It is of course to be understood that the embodiment of the invention herein disclosed is to be considered merely as illustrative and not in a limiting sense as various changes may be made in the details of construction and arrangement of parts without departing from the spirit of our invention as the invention is limited only in accordance with the scope of the appended claims.

Having thus described our invention, what we claim is:

1. A storage and cooling vessel for carbonated water comprising a container, means for delivering carbonated water to said container, means for dispensing carbonated water from said container, means for venting said container comprising a vent tube communicating with the interior of said container and leading to the exterior thereof and having a valve seat therein, a vent valve slidably mounted in said vent tube adapted to engage said valve seat, a float, snap acting mechanism operated by said float and including spring actuated means for moving the vent valve to and from its seat, said vent valve being arranged to move to open position against pressure within said container whereby said spring actuated means becomes ineffective to open said valve when the pressure within the vessel exceeds a predetermined valve, and additional means operable irrespective of pressure conditions within the container for positively opening the vent valve, said additional means including a bail pivotally mounted on said vent tube and operatively connected with said valve and including a part disposed in the path of movement of the snap acting mechanism so as to be actuated positively by the movement of said float to thereby positively move said vent valve to open position when the level of liquid in said container falls below a predetermined point.

2. A storage and cooling vessel for carbonated water comprising a container, means for delivering carbonated water to said container, means for dispensing carbonated water from said container, means for venting said container comprising a vent tube communicating with the interior of said container and leading to the exterior thereof and having a valve seat therein, a valve slidably mounted and guided within said vent tube, a bracket secured to said vent tube, an arm pivotally mounted on said bracket, a float carried by said arm, a bail pivotally mounted on said bracket so as to pivot about the same axis as said arm, said bail having direct operative connection with said vent valve and having a pair of oppositely disposed extensions, said arm also having a pair of oppositely disposed extensions thereon, spring means connecting the extensions on said bail and the extensions on said arm whereby to cause said valve to be opened and closed by said spring with a snap action, said valve being arranged to open against pressure within said vessel whereby said actuating spring becomes ineffective to open said valve when pressure within said container exceeds a predetermined value and additional means operable irrespective of pressure conditions within the container for positively opening the vent valve, said additional means including a second bail pivotally mounted on said vent tube and operatively connected with said valve, and means connected with said arm adapted to engage said second bail to positively open said valve when the level of liquid in said container falls below a predetermined point.

3. A storage and cooling vessel for carbonated water comprising a container, an inlet connection for delivering carbonated water to said container, an outlet connection for dispensing carbonated water from said container, a vent tube leading to the exterior of said container for venting said container under predetermined conditions, a vent valve for opening and closing said vent tube, a float, a snap acting mechanism operated by said float and including a spring actuated means for opening and closing said vent valve with a snap action, said vent valve being arranged to open against pressure within said container whereby said spring actuated means becomes ineffective to open said valve when pressure within the container exceeds a predetermined value, an additional means operable irrespective of pressure conditions within the container and actuated by the weight of the float for positively opening the vent valve when the level of liquid in the vessel falls below a predetermined point.

CYRIL P. DEIBEL.
OSCAR A. KNABLE.
RALPH ANSHUTZ.